F. G. COTTRELL.
PROCESS FOR SEPARATING AND COLLECTING PARTICLES OF ONE LIQUID SUSPENDED IN ANOTHER LIQUID.
APPLICATION FILED OCT. 12, 1909.
987,114.
Patented Mar. 21, 1911.
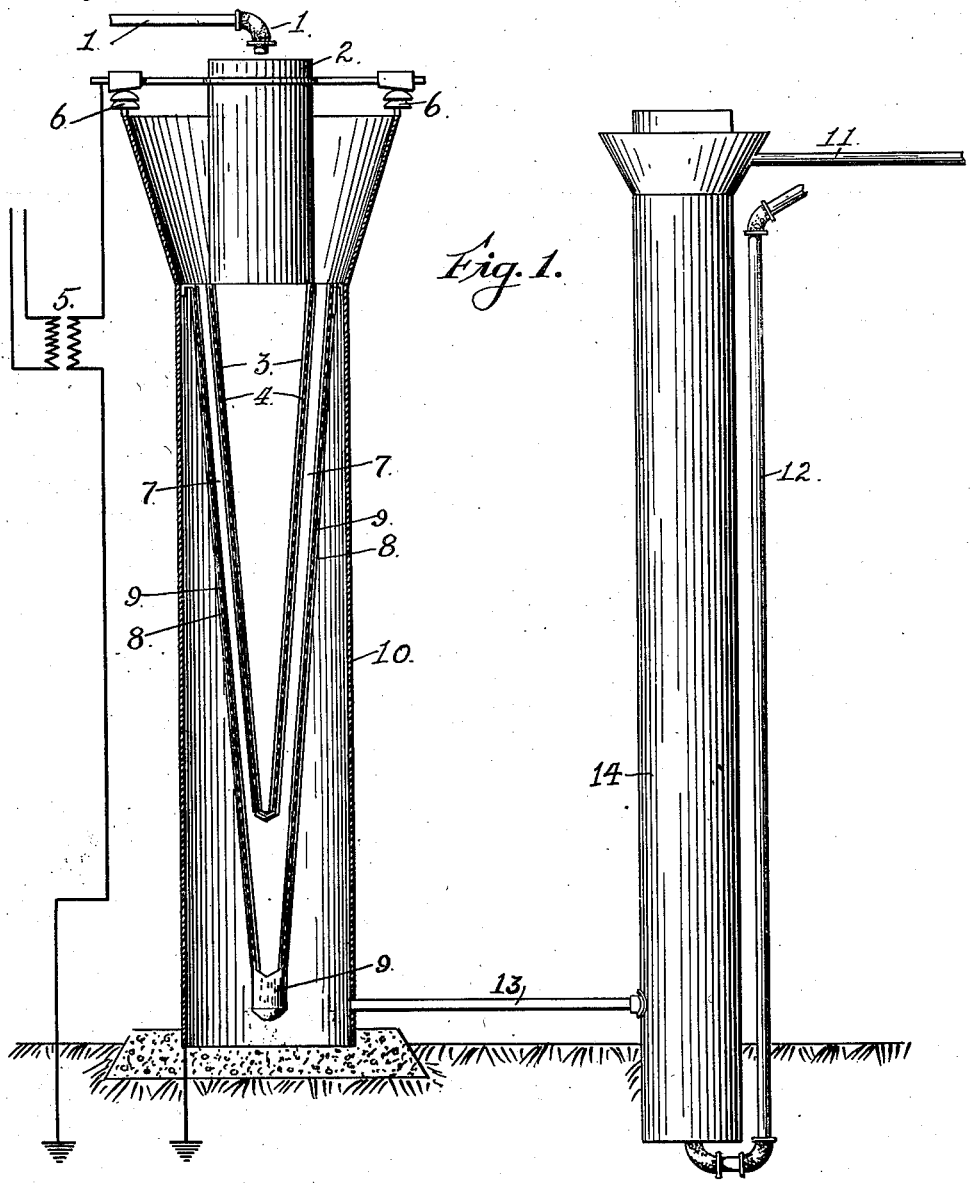
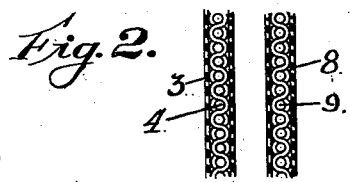
Witnesses:
Arthur L. Slee.
S. Constine.
Inventor.
Frederick Gardner Cottrell
by Wm. F. Booth
his Attorney.

UNITED STATES PATENT OFFICE.

FREDERICK GARDNER COTTRELL, OF BERKELEY, CALIFORNIA, ASSIGNOR, BY MESNE ASSIGNMENTS, TO PETROLEUM RECTIFYING COMPANY, OF SAN FRANCISCO, CALIFORNIA, A CORPORATION OF CALIFORNIA.

PROCESS FOR SEPARATING AND COLLECTING PARTICLES OF ONE LIQUID SUSPENDED IN ANOTHER LIQUID.

987,114.  Specification of Letters Patent.  Patented Mar. 21, 1911.

Application filed October 12, 1909. Serial No. 522,343.

*To all whom it may concern:*

Be it known that I, FREDERICK GARDNER COTTRELL, a citizen of the United States, residing at Berkeley, in the county of Alameda and State of California, have invented certain new and useful Improvements in Processes for Separating and Collecting Particles of One Liquid Suspended in Another Liquid, of which the following is a specification.

My invention relates to the art of separating mechanical mixtures of liquids, such, for example, as oil and water; and it consists in certain improvements, hereinafter fully described, in the methods and processes of such separation.

For the purposes of the present description, it will be convenient to roughly distinguish between two types of mixtures, namely, those in which the drops, forming the internal phase, suspended in the body of liquid forming the external phase, are large enough to be readily seen as such by the naked eye, and which may be termed macroscopic, and those in which they are too fine to be readily so perceived, and which may be termed microscopic. In the case of macroscopic suspensions where the external phase is a liquid of low viscosity and the difference in density of the two liquids is considerable, the separation of the two liquids will usually take place readily of itself, even in large containers; but when the viscosity is high or the difference in density slight, or the particles very small, the process of settling is often a very slow one; and it is particularly to such cases that my present improvements are directed. It is a well known fact that the viscosity of a mechanical mixture of two liquids may be many times that of either constituent.

Many forms of filtering devices for the separation of small quantities of one liquid suspended in another liquid, as, for example, lubricating oil in condensed water from steam engines, have been devised; but in these one trouble invariably to be contended with is the tendency of the filter, if fine enough to retain the smaller particles, to become clogged by the emulsion formed in its meshes. In all such filter processes thus far proposed, the filtration has been commenced with the filter, say, for example, a sheet of cloth, essentially free from the liquid forming the suspended or internal phase of the mixture, with the result that it immediately becomes wetted, at least predominantly, with the other liquid which is there in greater mass. The filter once thoroughly saturated with this liquid, the other will, necessarily, have to collect in globules or irregular droplets, without wetting the fabric, and in this condition tends to either obstruct the pores of the filter or be carried onward through them.

One of the fundamental operating conditions of my present improvement is the thorough initial wetting of the filter septum with a liquid which is readily miscible with the liquid forming the internal phase of the mixture to be treated, in practice the same liquid as composes said internal phase, thus establishing a continuous channel for the draining off of this internal phase liquid through this wetted septum, in a direction usually lateral to the general flow of the mixture to be separated. This procedure, in itself, often suffices to rapidly remove all the suspended liquid when this is in the form of drops as large or larger than the pores of the filter; but in case the suspended droplets are of microscopic dimensions, as is often the case in emulsions, and especially when the composition of either of the liquids is such as to occasion the formation of a more or less rigid film about the drops, as, for example, when oil containing dissolved resins is emulsified with water, then it often becomes expedient to combine certain electrical features in the treatment. As the basic phenomena from which these electric features have been developed have been fully described in an application for patent, Serial No. 497,167, filed May 20, 1909, by me jointly with James Buckner Speed, it will be sufficient for the purposes of this application to point out their special function in connection with and in relation to the present case. When dealing with a liquid as external phase, which is practically a non-conductor of electricity, the very minute suspended droplets of the internal phase may be caused to coalesce into larger masses easily retained by the wetted filter septum, by bringing the mixture for a time between and in contact with electrodes forming the terminals of a high voltage electric circuit, preferably an alternating current circuit. This treatment and its combination with the filtering improvement is still more effective if the two are directly combined by making the filtering septum a part of the electrode itself. In cases where the internal phase is a very much better electric conductor than the external phase, it is also advantageous to have the essentially active surfaces of the electrodes wholly and rather deeply submerged in the liquid undergoing treatment, so that there will be no tendency for the partially agglomerated internal phase liquid, to collect on such surfaces and cause short circuiting of the electrodes.

In order to make the practice of my improvements clear, the following description of a concrete case of its application to the separation and collection of suspended water particles from crude petroleum is given, reference being had to the accompanying drawings in which—

Figure 1 is a vertical sectional view of an apparatus in which my improvements may be carried out. Fig. 2 is a sectional detail, enlarged, showing the filtering septum.

The oil, carrying the suspended water enters through the pipe 1, and is delivered into the sheet iron cylinder 2, from which it flows downward into the double-walled metallic-screen cone 3, between the two screen layers of which is held a bag of cotton cloth 4. This cloth, before the contact of the oil therewith is to be thoroughly wetted with water. The iron cylinder 2, screen-cone 3 and cotton bag 4 constitute one of the electrodes, and are connected to the high potential wire of the step-up transformer 5, as shown. These parts are supported and otherwise entirely insulated by the insulators 6. The oil filters through the bag 4 into the space 7 between the cone 3 and a similar concentric, but larger, double-walled wire-screen cone 8, confining between its walls a previously water-wetted cotton bag 9 which cone and bag taken together form the other electrode, being connected to the other high-potential terminal of the high potential transformer 5, through their support on the outer shell 10 and the ground as shown. As the mixture of liquids passes through the cloth, the two electrode cones and the space between them, the fine particles of water are caused by the electric field to coalesce with each other and with the water wetting the cloth, and flow down through the cloth as a channel to the bottom of the cones and sink to the bottom of the shell 10 in large masses which readily coalesce of themselves, thus causing a sharp separation of the two liquids into distinct layers in the bottom of the shell 10 whence they may be separately withdrawn in any convenient manner, as, for instance, automatically by means of the pipe 13 and the trap vessel 14. The two liquids flow through the pipe 13 into the trap vessel 14, the heavier collecting at the bottom of said vessel and overflowing through and from the pipe 12, while the lighter fills the upper portion of the vessel 14 and overflows through the pipe 11. The proper heights of the liquid columns in the shell 10, the trap vessel 14 and the pipe 12 will, of course, depend upon the relative densities of the three liquids thus in balance.

Having thus described my invention, what I claim as new and desire to secure by Letters Patent is:—

1. The improvement in the art of separating and collecting particles of one liquid suspended in another liquid consisting in causing the mixture to be treated to pass through a pervious septum initially wetted with a liquid readily miscible with the liquid forming the suspended drops of the mixture, said septum forming part of a system of electrodes connected to a source of electricity of sufficient voltage to produce coalescence of the suspended drops and cause a separation of the two liquids whereby the separated and coalesced drops will drain through the wetted septum to its edge; and collecting said drained liquid in masses essentially free from the other constituent of the original mixture.

2. The improvement in the art of separating and collecting particles of one liquid suspended in another liquid consisting in causing the mixture to be treated to pass through a pervious septum initially wetted with a liquid readily miscible with the liquid forming the suspended drops of the mixture, said septum forming part of a system of electrodes connected to a source of alternating current of electricity of sufficient voltage to produce coalescence of the suspended drops and cause a separation of the two liquids, whereby the separated and coalesced drops will drain through the wetted septum to its edge; and collecting said drained liquid in masses essentially free from the other constituent of the original mixture.

3. The improvement in the art of separating and collecting particles of one liquid suspended in another liquid which latter liquid is essentially a non-conductor of electricity consisting in causing the mixture to be treated to pass through a pervious septum initially wetted with liquid readily miscible with the liquid forming the suspended drops of the mixture, said septum forming part of a system of electrodes whose essentially active surfaces are immersed below the surface layers of said mixture, said electrodes being connected to a source of electricity of sufficient voltage to produce coalescence of the suspended drops and cause a separation of the two liquids while preventing the coalescing drops from forming complete chains short circuiting the electrodes, whereby the separated and coalesced drops will drain through the wetted septum to its edge; and collecting said drained liquid in masses essentially free from the other constituent of the original mixture.

In testimony whereof I have signed my name to this specification in the presence of two subscribing witnesses.

FREDERICK GARDNER COTTRELL.

Witnesses:
 WM. F. BOOTH,
 D. B. RICHARDS.